(12) United States Patent
Lin

(10) Patent No.: US 8,052,284 B2
(45) Date of Patent: Nov. 8, 2011

(54) PROJECTOR WITH REDUCED SIZE AND HIGHER CONTRAST

(75) Inventor: Ming-Kuen Lin, Yun-Lin Hsien (TW)

(73) Assignee: Qisda Corporation, Taoyuan County (TW)

( * ) Notice: Subject to any disclaimer, the term of this patent is extended or adjusted under 35 U.S.C. 154(b) by 420 days.

(21) Appl. No.: 12/398,993

(22) Filed: Mar. 5, 2009

(65) Prior Publication Data
US 2009/0262311 A1 Oct. 22, 2009

(30) Foreign Application Priority Data
Apr. 18, 2008 (TW) ................................ 97114251 A

(51) Int. Cl.
*G03B 21/28* (2006.01)
*H04N 5/74* (2006.01)
(52) U.S. Cl. ............... 353/81; 353/98; 353/99; 348/771; 348/337
(58) Field of Classification Search ...................... 353/81, 353/98, 99; 348/771, 337
See application file for complete search history.

(56) References Cited

U.S. PATENT DOCUMENTS

| 6,185,047 B1 * | 2/2001 | Peterson et al. ............... 359/640 |
| 6,250,763 B1 * | 6/2001 | Fielding et al. .................. 353/31 |
| 6,560,048 B1 * | 5/2003 | Okamori et al. ............... 359/833 |
| 6,663,243 B2 * | 12/2003 | Fielding et al. .................. 353/31 |
| 7,207,678 B2 * | 4/2007 | Penn ............................... 353/81 |
| 7,210,788 B2 * | 5/2007 | Lee et al. .......................... 353/33 |

FOREIGN PATENT DOCUMENTS

| CN | 1580866 A | | 2/2005 |
| JP | 2001166255 A | | 6/2001 |
| JP | 2007256680 A | * | 10/2007 |

* cited by examiner

*Primary Examiner* — Georgia Y Epps
*Assistant Examiner* — Magda Cruz

(57) ABSTRACT

A projector with reduced size and higher contrast includes a prism assembly, a light system, and a Digital Micro-mirror Device (DMD). Only In the "ON" state of DMD, the light from the light system reflects to a projection screen through the prism assembly and the DMD. The prism assembly includes two prisms and a medium layer. The prism assembly is appropriately designed so as to disable the light in the "OFF" state from reflecting to the projection screen by two-time total internal reflection in the prism assembly, and also to reduce the size of the projector.

20 Claims, 11 Drawing Sheets

| Type | F | $\theta_{AOI}$ | $\alpha$ | $\beta$ |
|---|---|---|---|---|
| 1 | 2.4 | 24 | 33.37 | 48.92 |
| 2 | 2.4 | 25 | 32.72 | 48.89 |
| 3 | 2.4 | 26 | 32.07 | 48.87 |

FIG. 11

PROJECTOR WITH REDUCED SIZE AND HIGHER CONTRAST

BACKGROUND OF THE INVENTION

1. Field of the Invention

The present invention relates to a projector; more specifically, relates to an innovatively designed prism assembly for a projector for reducing size of the projector and providing higher contrast.

2. Description of the Prior Art

Please refer to FIG. 1. FIG. 1 is the schematic view of a prior art projector 100 with smaller size. As shown in FIG. 1, projector 100 has a light system 110, a lens assembly 120, a digital micro-mirror device (DMD) 130 and a prism assembly 140.

Light system 110 generates lights, which emit to prism assembly 140; after that, the lights are reflected to DMD 130, which will again reflect the lights. DMD 130 comprises a dust-proof cover and a plurality of micro mirrors M. Micro mirrors M of DMD 130 are used to reflect the lights from the light system 110 reflected through prism assembly. Each micro mirror M rotates along a rotating axis to the ON state $S_{ON}$ (the solid lines of DMD 130 in FIG. 1) or to the OFF state $S_{OFF}$ (the broken lines of DMD 130 in FIG. 1), respectively, according to a control signal. More specifically, each micro mirror M is in the FLAT state $S_{FLAT}$ before receiving the control signal, and is paralleled to the dust-proof cover of DMD 130. As receiving the control signal for enabling, micro mirrors M rotate clockwise to an angle $\theta_S$; as receiving the control signal for disabling, micro mirrors M rotate counter-clockwise to an angle $\theta_S$. Therefore, the included angle of micro mirrors M between the ON state $S_{ON}$ and the OFF state $S_{OFF}$ is $2\theta_S$. In the ON state $S_{ON}$, micro mirrors M will reflect the incident light through prism assembly 140, then into lens assembly 120 so as to project the light onto the projection screen. In the OFF state $S_{OFF}$, micro mirrors M will rotate to an included angle $2\theta_S$ to reflect the incident light through the prism assembly 140 so that after the light passes through prism assembly 140, it will carry on in the direction away from the optical axis $A_2$ of the lens assembly 120 instead of entering into lens assembly 120.

Prism assembly 140 comprises two prisms $T_A$ and $T_B$, and a medium layer X. Prisms $T_A$ and $T_B$ are usually glass pillars; prism $T_A$ comprises three planes $P_1$, $P_2$, and $P_3$; prism $T_B$ comprises three planes $P_4$, $P_5$, and $P_6$. Medium layer X is usually air layer locating between the plane $P_2$ of prism $T_A$ and the plane $P_4$ of prism $T_B$. Prisms $T_A$ and $T_B$ have a refractive index $N_1$, medium layer X has a refractive index $N_2$; $N_2$ is smaller $N_1$, which means compare to prisms $T_A$ and $T_B$, medium layer X is a less dense medium. When the light emits into plane $P_2$ of prism $T_A$ from the light system 110 and the incident angle is smaller than the total reflection angle of prism $T_A$, the total reflection will occur on plane $P_2$. Additionally, plane $P_3$ is paralleled with DMD 130, plane $P_5$ is paralleled with lens assembly 120 (i.e. $P_5$ is perpendicular to the optical axis $A_2$ of lens assembly 120). The included angles between plane $P_1$ and plane $P_2$ and between plane $P_2$ and plane $P_3$ respectively are $\beta$ and $\alpha$. The included angle between planes $P_6$ and $P_5$ is $\gamma$, which is an acute or right angle, i.e. the angle $\gamma$ is smaller or equal to a right angle.

Light system 110 is usually a gas discharge lamp using elliptic lampshade to gather lights, which emit along an optical axis $A_1$. In other words, light system 110 is a light source with focal length f/# (f-number), in which the optical axis $A_1$ is about perpendicular to plane $P_1$.

Please still refer to FIG. 1. The lights from the light system 110 move along optical axis $A_1$ and pass through plane $P_1$; after emitting to prism $T_A$, the lights are totally reflected from plane $P_2$ to the plane of DMD 130 (i.e. the dust-proof cover of DMD 130) though plane $P_3$, and an included angle between the normal to the plane of DMD 130 and the incident light is $\theta_{AOI}$. Next, micro mirrors M will again reflect the incident lights. When in the ON state $S_{ON}$, the lights reflected by micro mirrors M (the solid lines in FIG. 1) will pass through plane $P_3$ and be refracted between planes $P_2$ and $P_4$, then emit out from plane $P_5$ to lens assembly 120. When in the OFF state $S_{OFF}$, the lights reflected by micro mirrors M (the broken lines in FIG. 1 ) will pass through plane $P_3$ and be refracted between planes $P_2$ and $P_4$, then emit out from plane $P_5$ in the direction away from the optical axis $A_2$ of lens assembly 120 instead of entering into lens assembly 120.

Please refer to FIG. 2. FIG. 2 is the schematic view of prior art projector 100 with lower contrast when in the OFF state. The lights from the edge of light system 110 pass through plane $P_1$; after emitting to prism $T_A$, the lights are totally reflected from plane $P_2$ through plane $P_3$, to DMD 130. Since the light system 110 has focal length F, the direction of lights from the edge of light system 110 is different than that from the center. As in the ON state $S_{ON}$, the lights reflected by micro mirrors M (the solid lines in FIG. 2) will pass through plane $P_3$ and be refracted between planes $P_2$ and $P_4$, then emit out from plane $P_5$ to lens assembly 120. As in the OFF state $S_{OFF}$, the lights reflected by micro mirrors M (the broken lines in FIG. 2) will pass through plane $P_3$ and be refracted between planes $P_2$ and $P_3$, then emit out to plane $P_6$. After being totally reflected from plane $P_6$, the lights will again emit out from plane $P_5$ to lens assembly 120, as shown in FIG. 2. Thus the contrast of projector 100 will be reduced.

Please refer to FIG. 3. FIG. 3 is the schematic view of prior art projector 200 with high contrast. In FIG. 3, except prism assembly 240, the remaining elements are identical to those of projector 100; the description related to such functions thus will not be stated herein.

Similarly, prism assembly 240 also comprises two prisms $T_A$ and $T_B$ and a medium layer X. The lights from light system 110 move along the optical axis $A_1$ and pass through plane $P_1$; after emitting to prism $T_A$, the lights are totally reflected from plane $P_2$ through plane $P_3$ to DMD 130, and an included angle between the normal to the plane of DMD 130 and the incident light is $\theta_{AOI}$. Next, the micro mirrors M will again reflect the incident lights. As in the ON state $S_{ON}$, the lights reflected by micro mirrors M (the solid lines in FIG. 3) will pass through plane $P_3$ and be refracted between planes $P_2$ and $P_4$, then emit out from plane $P_5$ to lens assembly 120. As in the OFF state $S_{OFF}$, the lights reflected by micro mirrors M (the broken lines in FIG. 3) will pass through plane $P_3$ and be refracted between planes $P_2$ and $P_4$, then emit out from plane $P_5$ in the direction away from the optical axis $A_2$ of lens assembly 120 instead of entering into lens assembly 120.

Please refer to FIG. 4. FIG. 4 is the schematic view of the prior art projector 200 with increased contrast when in the OFF state. Lights from the edge of the light system 110 pass through plane $P_1$; after being emitted to prism $T_A$, the lights are totally reflected from plane $P_2$ through plane $P_3$ to DMD 130. Since the light system 110 has focal length F, the direction of lights from the edge of light system 110 is different than that from the center. As in the ON state $S_{ON}$, the lights reflected by micro mirrors M (the solid lines in FIG. 4) will pass through plane $P_3$ and be refracted between planes $P_2$ and $P_4$, then emit out from plane $P_3$ to lens assembly 120. As in the OFF state $S_{OFF}$, the lights reflected by micro mirrors (the broken lines in FIG. 4) will pass through plane $P_3$ and be refracted between planes $P_2$ and $P_4$, then emit out from plane $P_5$ instead of entering into lens assembly 120, as shown in FIG. 4. Thus the contrast of projector 200 may be increased. Nonetheless, compare to prism assembly 140, prism assembly 240 has greater size hence the size of projector 200 becomes larger, that made it inconvenient for users.

Therefore in the OFF state, prior art projector 100 is not able to keep all lights away from lens assembly 120 (i.e. there are still stray lights entering into lens assembly 120), which would result in low contrast or even light leakage in projector 100. It is necessary to improve an image quality as bad as it is. In the prior art projector 200, however, size of prism $T_B$ in prism assembly 240 is increased to enhance contrast; thus the size of projector 200 is increased and that has made it inconvenient for users.

SUMMARY OF THE INVENTION

The present invention provides a projector with reduced size and higher contrast. The projector comprises a light system with a first optical axis for emitting a first light, a digital micro-mirror device (DMD), a prism assembly, and a lens assembly. The DMD comprises a plurality of micro mirrors rotatable to a first angle or a second angle. The prism assembly comprises a medium layer having a reference refractive index, a first prism, and a second prism. The first prism locates at a first side of the medium and has a prism refractive index which is larger than the reference refractive index. The first prism is used to totally reflect the first light to form a second light to the DMD. The second prism locates at a second side of the medium layer and has the prism refractive index. The lens assembly is with a second optical axis. As the micro mirrors of the DMD rotate to the first angle, the micro mirrors of the DMD reflect the second light into the lens assembly through the first prism, the medium layer, and the second prism. As the micro mirrors of the DMD rotate to the second angle, the second light is reflected from the micro mirrors of the DMD to the prism assembly and emits out of the prism assembly in a direction away from the second optical axis after two-time internally total reflection in the prism assembly.

The present invention further provides a projector with reduced size and higher contrast. The projector comprises a light system with a first optical axis for emitting a first light, a DMD, a prism assembly, and a lens assembly. The DMD comprises a plurality of micro mirrors rotatable to a first angle or a second angle. The prism assembly comprises a medium layer having a reference refractive index, a first prism, and a second prism. The first prism locates at a first side of the medium layer and has a prism refractive index which is greater than the reference refractive index. The first prism comprises a first plane passed through by the first light, a second plane coupled to the first plane of the first prism and locating at the first side of the medium layer for totally reflecting the first light to form a second light, and a third plane coupled to the first plane of the first prism and the second plane of the first prism, and being paralleled with the DMD. The second prism locates at a second side of the medium layer and has the prism refractive index. The second prism comprises a fourth plane locating at the second side of the medium layer, a fifth plane coupled to the fourth plane of the second prism, and a sixth plane coupled to the fourth plane of the second prism and the fifth plane of the second prism. An obtuse angle is included between the fifth plane of the second prism and the sixth plane of the second prism. The lens assembly is opposite to the fifth plane of the second prism and is with a second optical axis. As the micro mirrors of the DMD rotate to the first angle, the micro mirrors of the DMD reflect the second light into the lens assembly through the first prism, the medium layer, and the second prism. As the micro mirrors of the DMD rotate to the second angle, the micro mirrors reflect the second light to the sixth plane of the second prism, and the second light is totally reflected for the first time from the sixth plane of the second prism to the fifth plane of the second prism, and after being totally reflected for the second time from the fifth plane of the second prism, the second light emits out of the prism assembly in a direction away from the second optical axis.

The present invention further provides a projector with reduced size and higher contrast. The projector comprises a light system with a first optical axis for emitting a first light, a DMD, a prism assembly, and a lens assembly. The DMD comprises a plurality of micro mirrors rotatable to a first angle or a second angle. The prism assembly comprises a medium layer having a reference refractive index, a first prism, and a second prism. The first prism locates at a first side of the medium layer and has a prism refractive index which is greater than the reference refractive index. The first prism comprises a first plane passed through by the first light, a second plane coupled to the first plane of the first prism and locating at the first side of the medium layer for reflecting the first light to form a second light, a third plane coupled to the first plane of the first prism and being paralleled with the DMD; and a cross section coupled to the second plane of the first prism and the third plane of the first prism. The second prism locates at a second side of the medium layer and has the prism refractive index. The second prism comprises a fourth plane locating at the second side of said medium layer, a fifth plane coupled to the fourth plane of the second prism, and a sixth plane coupled to the fourth plane of the second prism and the fifth plane of the second prism. The lens assembly is opposite to the fifth plane of the second prism and is with a second optical axis. As micro mirrors of the DMD rotate to the first angle, the micro mirrors of the DMD reflect the second light into the lens assembly through the first prism, the medium layer, and the second prism. As the micro mirrors of the DMD rotate to the second angle, the second light is reflected from the micro mirrors of the DMD to the cross section of the first prism, is totally reflected for the first time from the cross section to the second plane of the first prism whereon the second light is totally reflected for the second time, and emits out of the prism assembly in a direction away from the second optical axis.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 11 is the schematic view of the actual value of the defined included angles in the present invention.

DETAILED DESCRIPTION

Therefore, the present invention provides an improved prism assembly for both better size and contrast of the projector.

Figure 1:
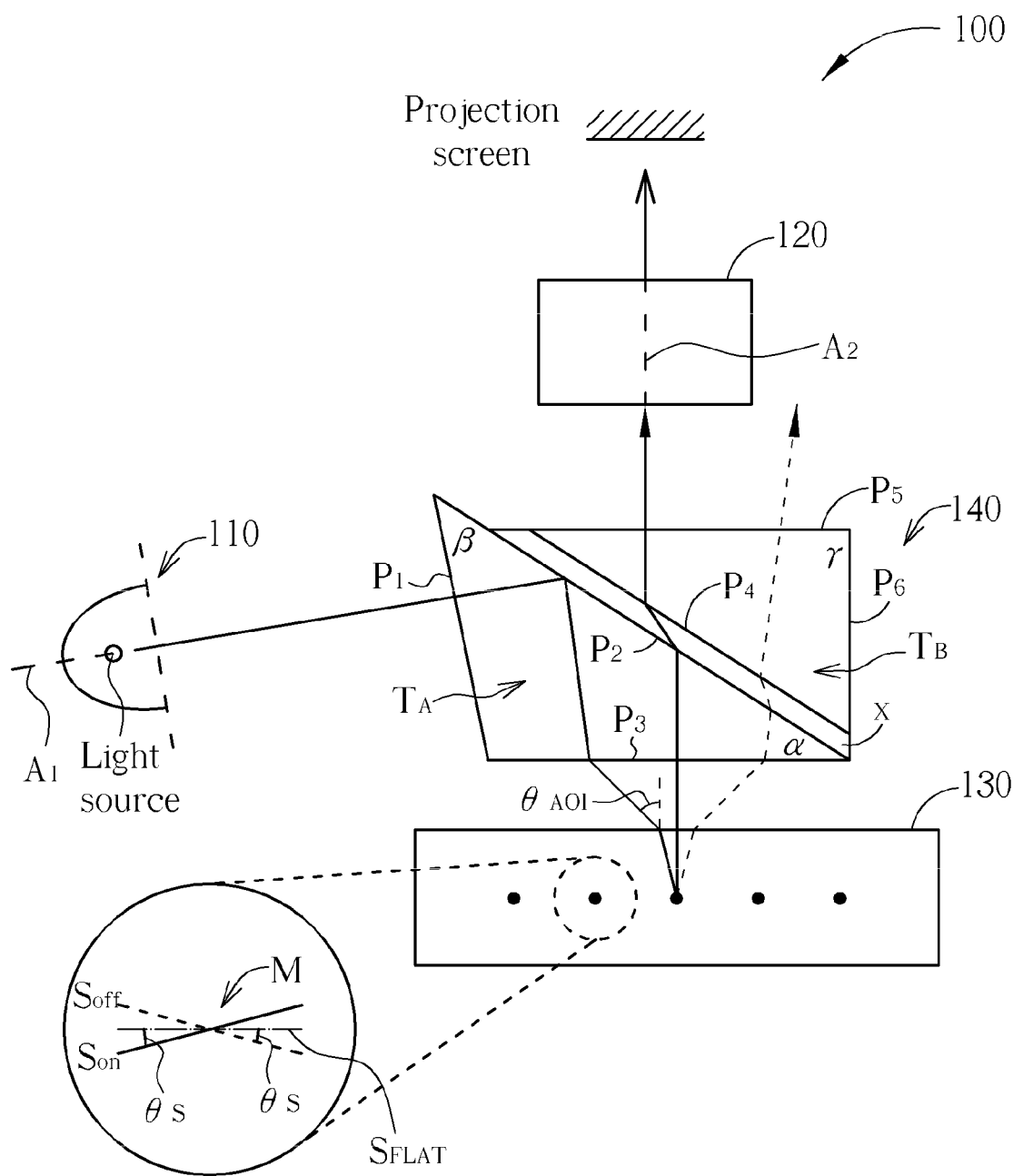
FIG. 1 is the schematic view of a prior art projector with smaller size.
Figure 2:
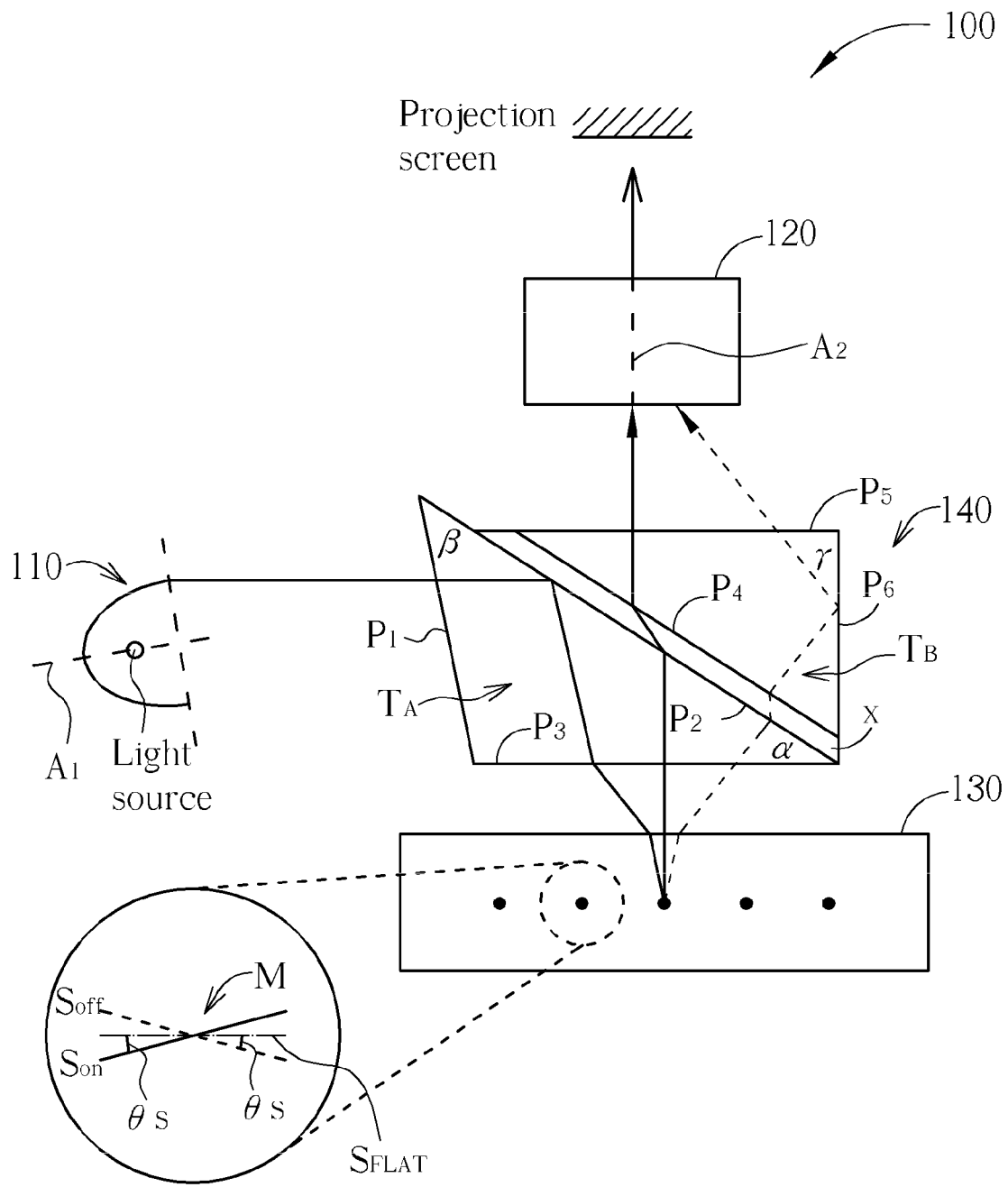
FIG. 2 is the schematic view of the smaller-sized prior art projector with reduced contrast when in the OFF state.
Figure 3:
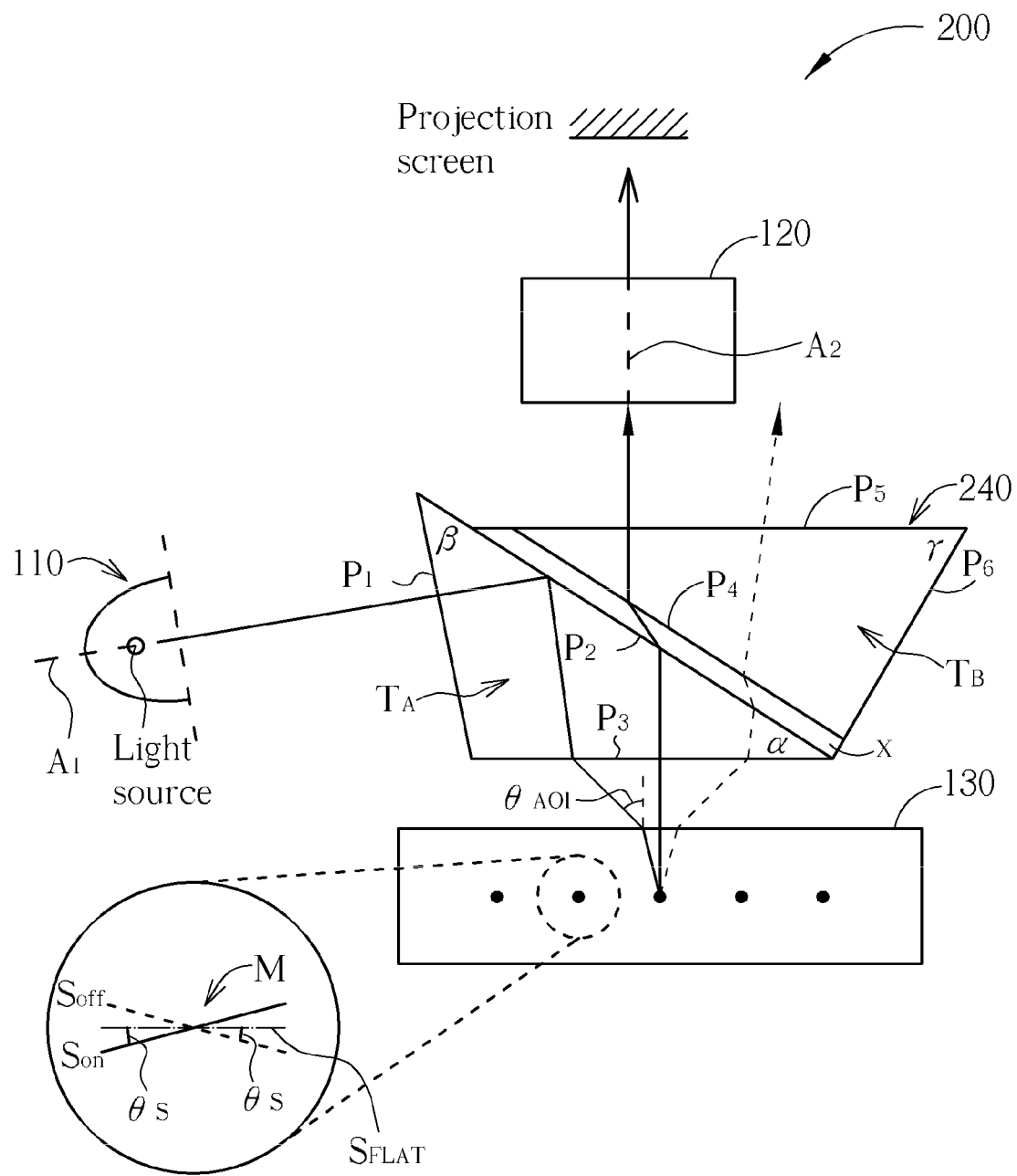
FIG. 3 is the schematic view of a prior art projector with higher contrast.
Figure 4:
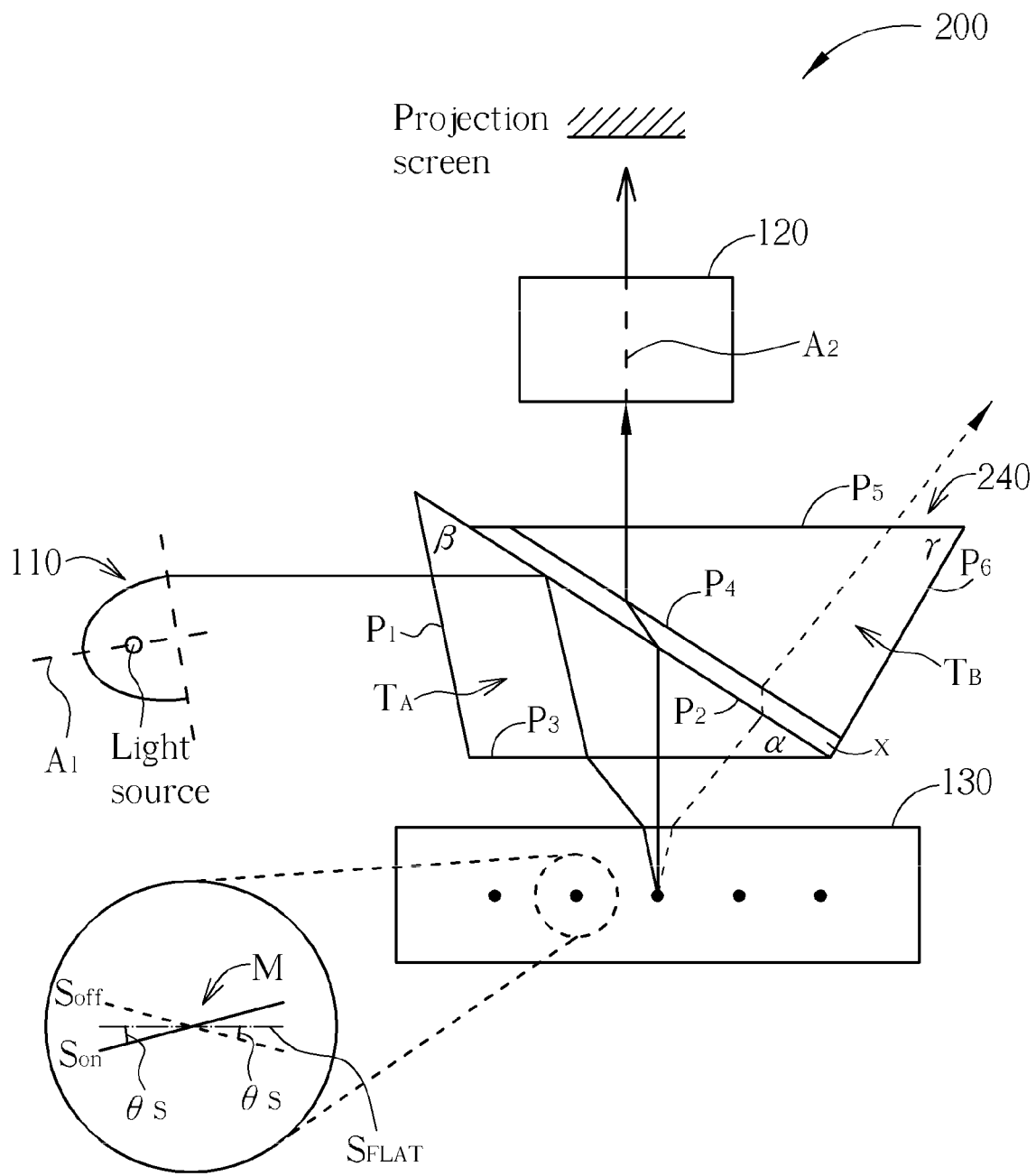
FIG. 4 is the schematic view of the prior art projector with increased contrast when in the OFF state.
Figure 5:
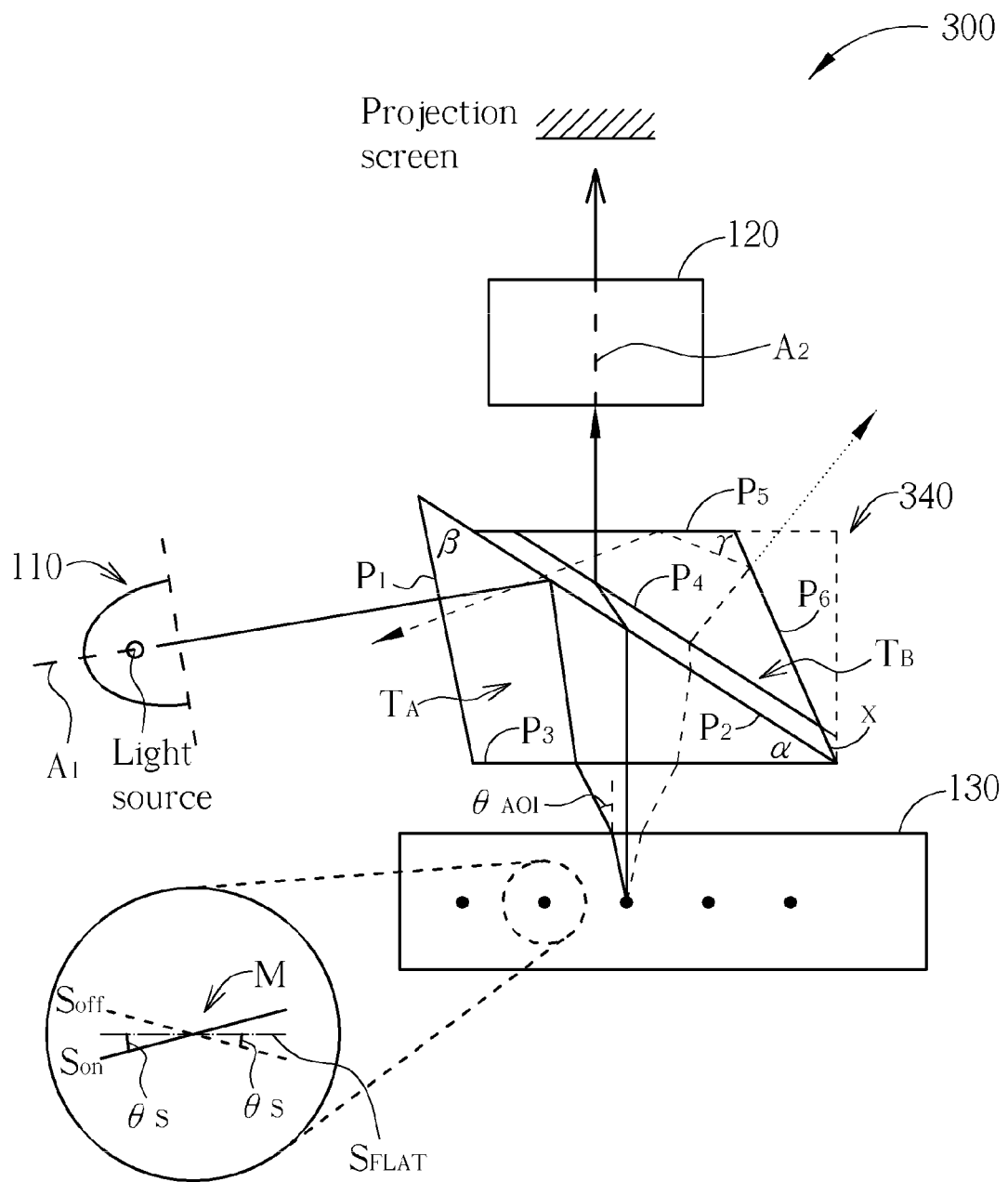
FIG. 5 is the schematic view of a projector of a first embodiment in the present invention.

Please refer to FIG. 5. FIG. 5 is the schematic view of projector 300 of a first embodiment in the present invention. In FIG. 5, except prism assembly 340, the remaining elements are identical to those of projector 100; the description related to such functions thus will not be stated herein.

Prism assembly 340 is the internally shrank partial block of the prism assembly 140 to form the shape as shown in FIG. 5. Similarly, prism assembly 340 comprises two prisms $T_A$ and $T_B$, and a medium layer X. Prisms $T_A$ and $T_B$ are glass pillars for example; prism $T_A$ has three planes $P_1$, $P_2$, and $P_3$; prism $T_B$ has three planes $P_4$, $P_5$, and $P_6$. Medium layer X is an air layer for example; locating between plane $P_2$ of prism $T_A$ and plane $P_4$ of prism $T_B$. Prisms $T_A$ and $T_B$ have a refractive index $N_1$, medium X has a refractive index $N_2$; and $N_2$ is less than $N_1$. In addition, plane $P_3$ is paralleled with DMD 130, plane $P_5$ is paralleled with lens assembly 120 (i.e. plane $P_5$ is perpendicular to the optical axis $A_2$ of lens assembly 120). The included angles between planes $P_1$ and $P_2$ and between plane $P_2$ and plane $P_3$ respectively are β and α. The included angle between planes $P_5$ and $P_6$ is γ; and γ is an obtuse angle, which is a feature of this embodiment of the present invention.

Please still refer to FIG. 5. The lights from the light system 110 move along optical axis $A_1$ and pass through plane $P_1$; after emitting to prism $T_A$, the lights are totally reflected from plane $P_2$ to prism assembly 130 through plane $P_3$, and an included angle between the normal to the plane of DMD 130 and the light is $θ_{AOI}$. Micro mirrors M will again reflect the incident lights. As in the ON state $S_{ON}$, the lights reflected by micro mirrors M (the solid lines in FIG. 5) will pass through plane $P_3$ and be refracted between planes $P_2$ and $P_4$, then emit out from plane $P_5$ to the lens assembly 120. As in the OFF state $S_{OFF}$, the lights reflected by the micro mirrors M (the broken lines in FIG. 5) will pass through plane $P_3$ and be refracted between the planes $P_2$ and $P_4$, then emit out to plane $P_6$; the lights are totally reflected from plane $P_6$ for the first time then emit to plane $P_5$; and are totally reflected from plane $P_5$ for the second time then emit out from plane $P_1$ in the direction away from the optical axis $A_2$ of lens assembly 120 instead of entering into lens assembly 120. Furthermore, the dotted lines part in FIG. 5 is to illustrate the emitted lights from the prior art prism assembly 140 in the OFF state.

Figure 6:
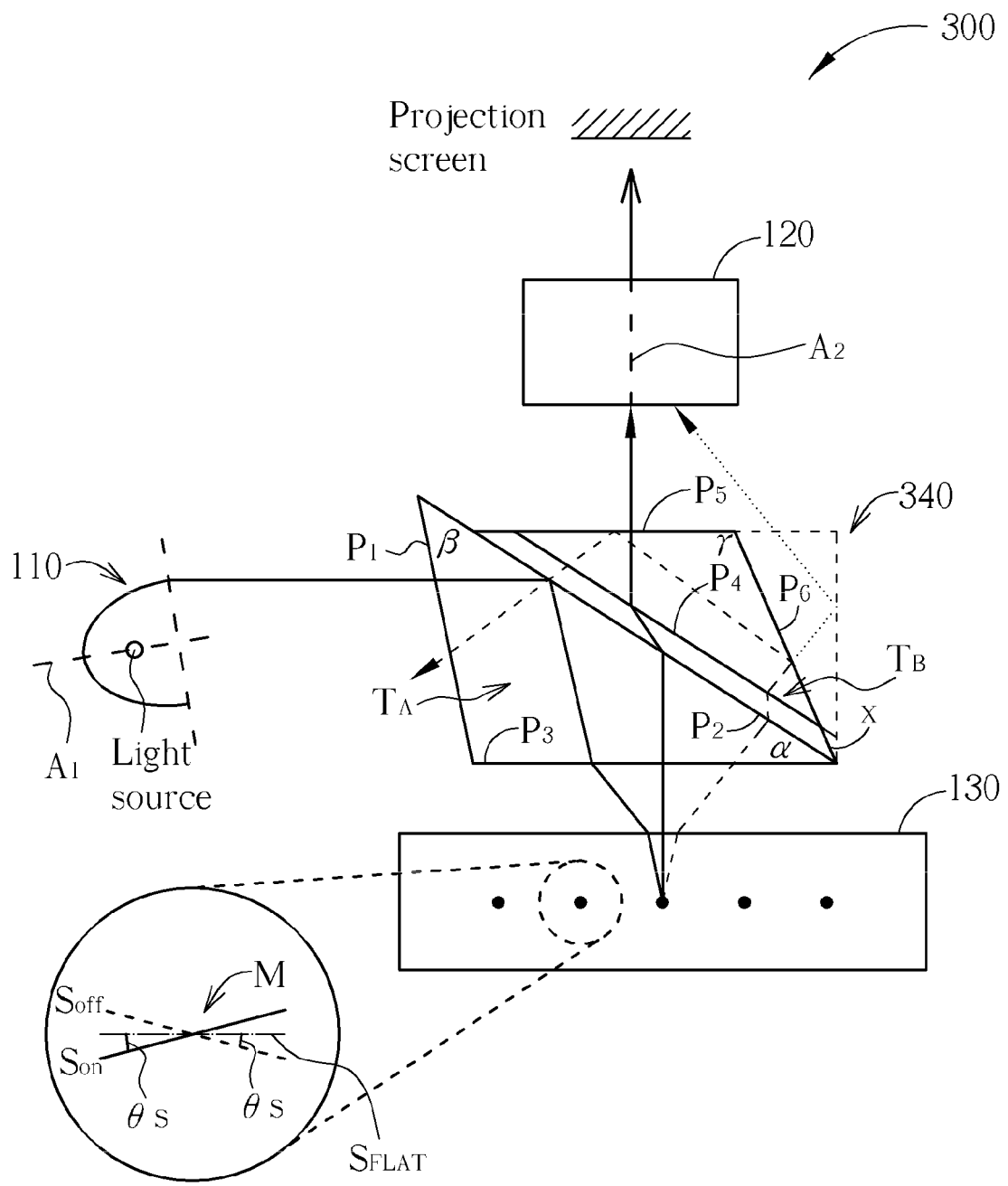
FIG. 6 is the schematic view illustrating enhancing contrast and further reducing light leakage using the prism assembly of the first embodiment in the present invention.

Please refer to FIG. 6. FIG. 6 is the schematic view illustrating enhancing contrast and further reducing light leakage using the prism assembly of the first embodiment in the present invention. After the lights from the edge of light system 110 emit into prism $T_A$ through plane $P_1$, they are totally reflected from plane $P_2$ to DMD 130 through plane $P_3$. Because light system 110 has focal length F, the direction of lights from the edge of light system 110 is different than that from the center. As in the ON state $S_{ON}$, the lights reflected by micro mirrors M (the solid lines in FIG. 6) will pass through plane $P_3$ and be refracted between planes $P_2$ and $P_4$, then emit out from plane $P_5$ to lens assembly 120. As in the OFF state $S_{OFF}$, the lights reflected by micro mirrors M (the broken lines in FIG. 6) will pass through plane $P_3$ and be refracted between planes $P_2$ and $P_4$, then emit to plane $P_6$. The lights are totally reflected for the first time at plane $P_6$ then are reflected to plane $P_5$; and totally reflected for the second time at plane $P_5$ then emit out from plane $P_1$ in the direction away from the optical axis $A_2$ of lens assembly 120 instead of entering into lens assembly 120. In contrast to the lights emitted out from the prior art projector 100 in the OFF state $S_{OFF}$ (the dotted lines in FIG. 6), the lights emitted out under such condition in the present invention will not enter into lens assembly 120 and that would result in bad contrast. Therefore, the contrast will be enhanced and the light leakage will be reduced in the OFF state by using the size-limited prism assembly 340 of the first embodiment in the present invention.

Figure 7:
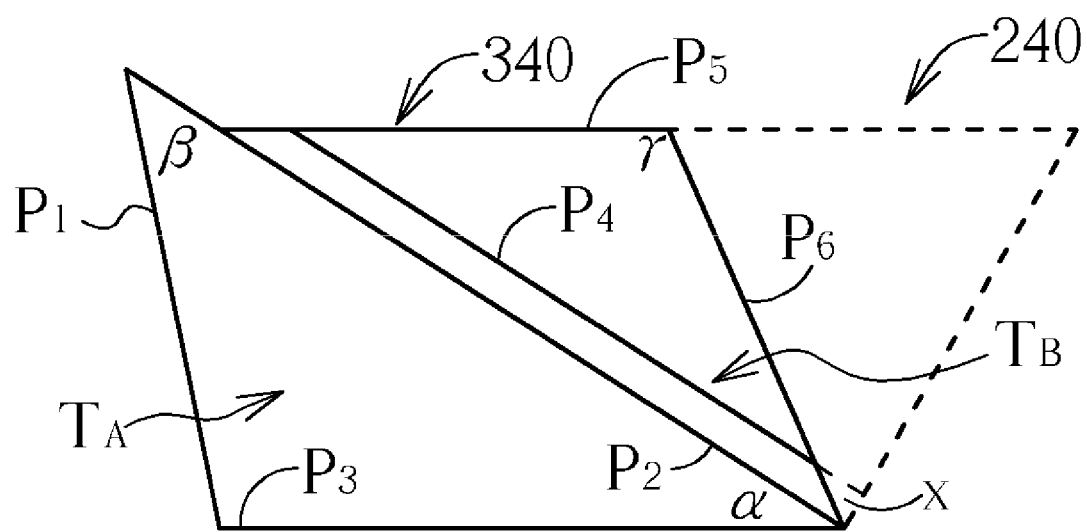
FIG. 7 is the schematic view illustrating size comparison between the prism assembly of the first embodiment in the present invention and the prism assembly of the prior art projector with higher contrast.

Please refer to FIG. 7. FIG. 7 is the schematic view illustrating the size comparison between the prism assembly 340 of the first embodiment in the present invention and the prism assembly 240 of the prior art projector. As shown in FIG. 7, the prism assembly 340 of the first embodiment in the present invention still has smaller size compare to the prism assembly 240 of prior art, and it can also enhance the contrast of projector.

Figure 8:
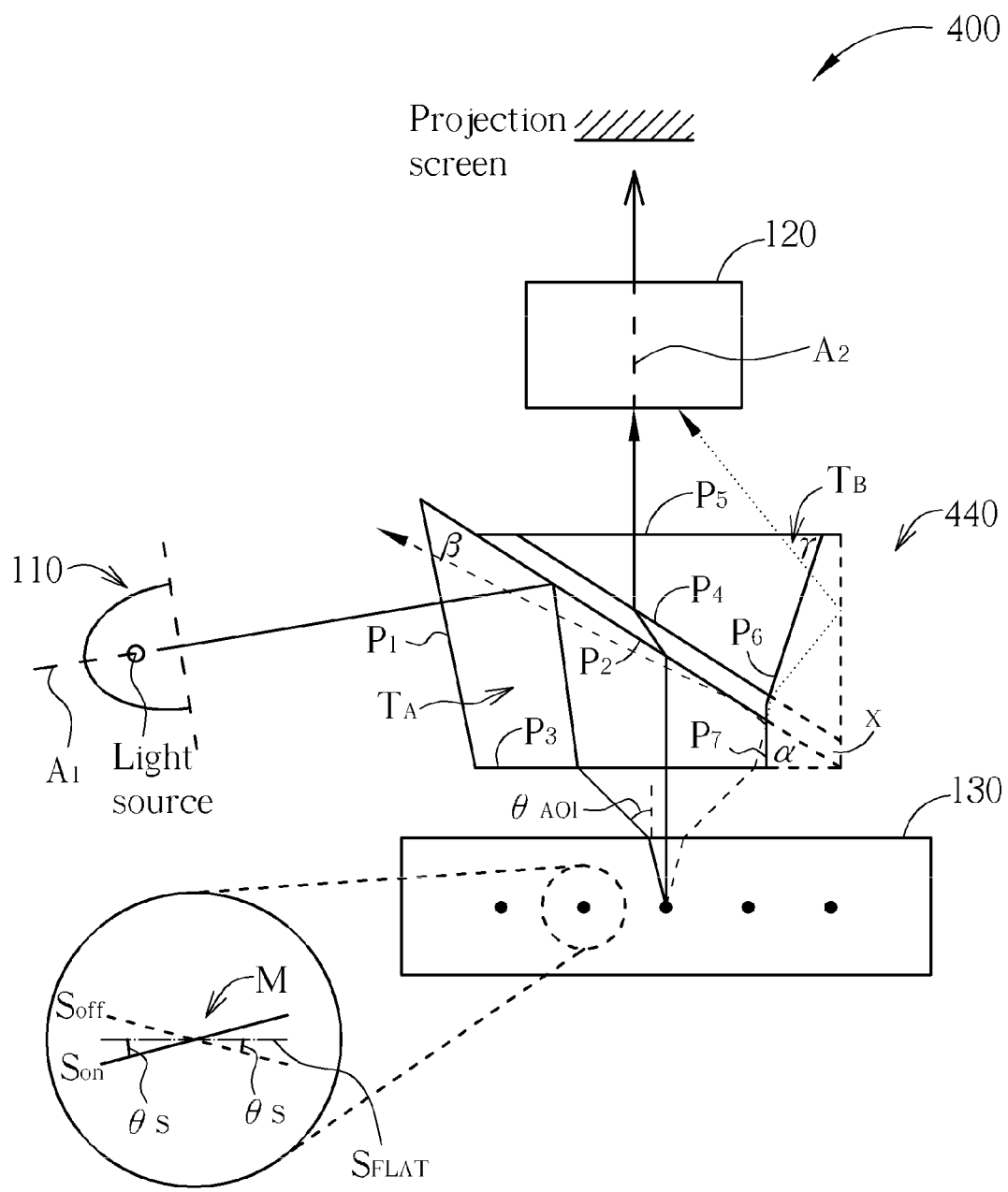
FIG. 8 is the schematic view of a projector of a second embodiment in the present invention.

Please refer to FIG. 8. FIG. 8 is the schematic view of projector 400 of a second embodiment in the present invention. In FIG. 8, except prism assembly 440, the remaining elements are identical to those of projector 100; the related functions hence will not be stated herein.

Prism assembly 440 is the internally shrank partial block of prism assembly 140 and a cross section $P_7$ is placed between planes $P_2$ and $P_3$ to form the shape as shown in FIG. 8. Similarly, prism assembly 440 comprises two prisms $T_A$ and $T_B$, and a medium layer X. Prism $T_A$ and $T_B$ are glass pillars for example; prism $T_A$ has four planes $P_1$, $P_2$, $P_3$, and the cross section $P_7$; prism $T_B$ has three planes $P_4$, $P_5$, and $P_6$. In other words, prism assembly 440 is the planes $P_2$ and $P_3$ of prism $T_A$ in prism assembly 340 that has been partially cut off to form the cross section $P_7$. Medium layer X is an air layer for example, locating between plane $P_2$ of prism $T_A$ and plane $P_4$ of prism $T_B$. Prisms $T_A$ and $T_B$ has a refractive index $N_1$, medium layer X has a refractive index $N_2$; $N_2$ is less than $N_1$. In addition, plane $P_3$ is paralleled with DMD 130, plane $P_5$ is paralleled with lens assembly 120 (i.e. plane $P_5$ is perpendicular to the optical axis $A_2$ of lens assembly 120). The included angles between planes $P_1$ and $P_2$ and between plane $P_2$ and plane $P_3$ respectively are β and α.

Please still refer to FIG. 8. After the lights from the light system 110 move along optical axis $A_1$ to the prism $T_A$ and pass through plane $P_1$, they are totally reflected from plane $P_2$ to DMD 130 through plane $P_3$, and an included angle between the normal to the plane of DMD 130 and the light is $θ_{AOI}$. After that, the micro mirrors M will again reflect the incident lights. As in the ON state $S_{ON}$, the lights reflected by micro mirrors M (the solid lines in FIG. 8) will pass through plane $P_3$ and be refracted between $P_2$ and $P_4$, then emit out from plane $P_5$ to lens assembly 120. As in the OFF state $S_{OFF}$, the lights reflected by micro mirrors M (the broken lines in FIG. 8) will pass through plane $P_3$ and they will be totally reflected for the first time at the cross section $P_7$ then be reflected to plane $P_2$; and totally reflected for the second time at plane $P_2$ then emit out from plane $P_1$ in the direction away from the optical axis $A_2$ of lens assembly 120 instead of entering into lens assembly 120. In addition, the dotted lines appeared in FIG. 8 is to illustrate the emitted lights from the prior art prism assembly 140 in the OFF state.

Figure 9:
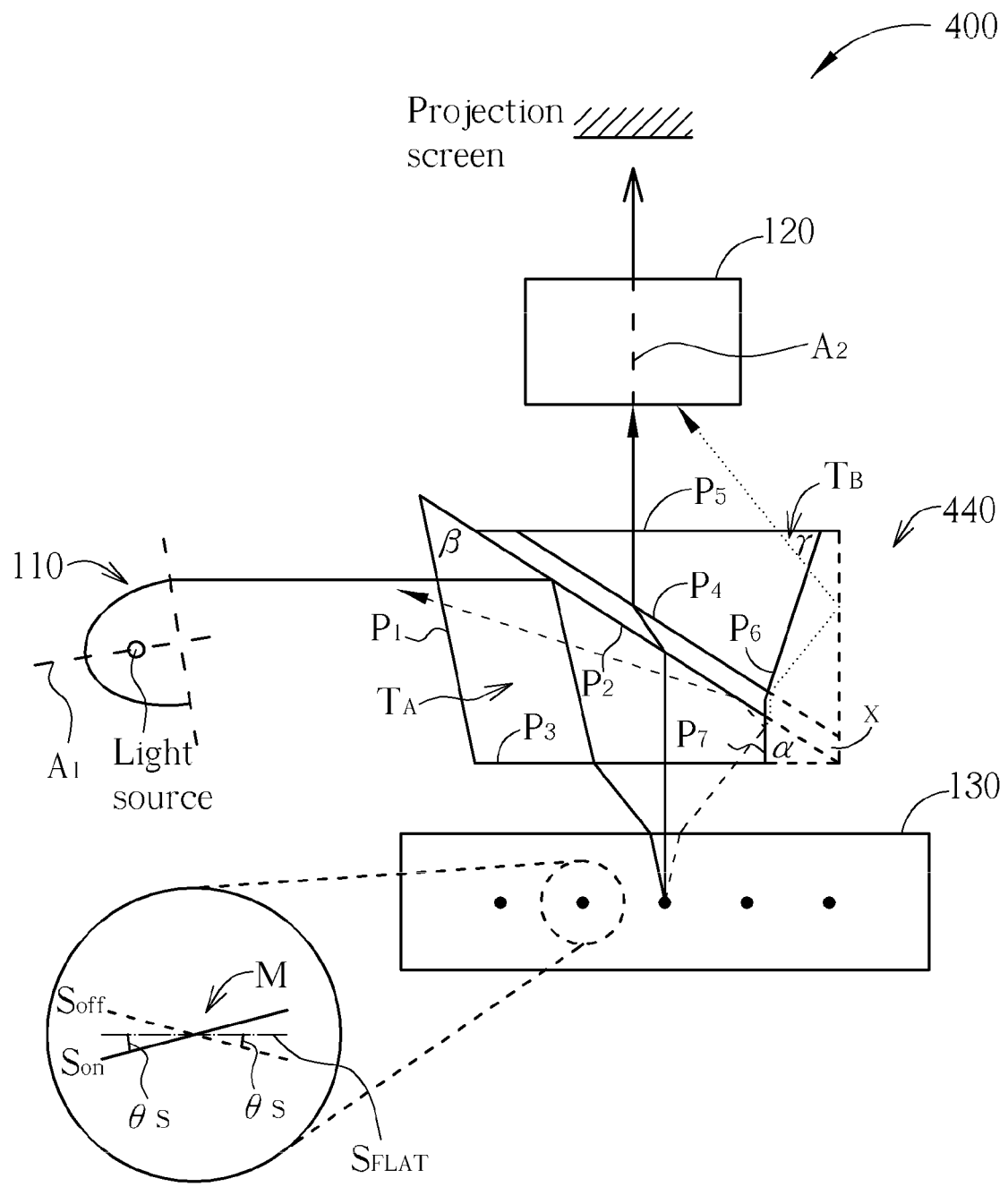
FIG. 9 is the schematic view illustrating enhancing contrast and further reducing light leakage using the prism assembly of the second embodiment in the present invention.

Please refer to FIG. 9. FIG. 9 is the schematic view illustrating enhancing contrast and further reducing light leakage by using the prism assembly 440 of the second embodiment in the present invention. After the lights from the edge of light system 110 enter into prism $T_A$ through plane $P_1$, they are totally reflected from plane $P_2$ to DMD 130 through plane $P_3$. Because the light system 110 has focal length F, the direction of the lights from the edge of the light system 110 is different than that from the center. When in the ON state $S_{ON}$, the lights reflected by micro mirrors M (the solid lines in FIG. 9) will pass through plane $P_3$ and be refracted between planes $P_2$ and $P_4$, then emit out from plane $P_5$ to the lens assembly 120. When in the OFF state $S_{OFF}$, the lights reflected by micro mirrors M (the broken lines in FIG. 9) will pass through plane $P_3$ to plane $P_2$; the lights will be totally reflected for the first time at the cross section $P_7$ then be reflected to plane $P_2$, the lights will then be totally reflected for the second time at plane $P_2$ and emit out from plane $P_1$ in the direction away from the optical axis $A_2$ of lens assembly 120 instead of entering into lens assembly 120. In contrast to the lights emitted out from the prior art projector 100 in the OFF state $S_{OFF}$ (the dotted lines in FIG. 9), the lights emitted out under this condition in the present invention will not enter into lens assembly 120 and as a result, the contrast is not good. By using the size-limited prism assembly 440 of the second embodiment of the present invention, the contrast of the projector will be enhanced and the light leakage will be reduced.

Figure 10:
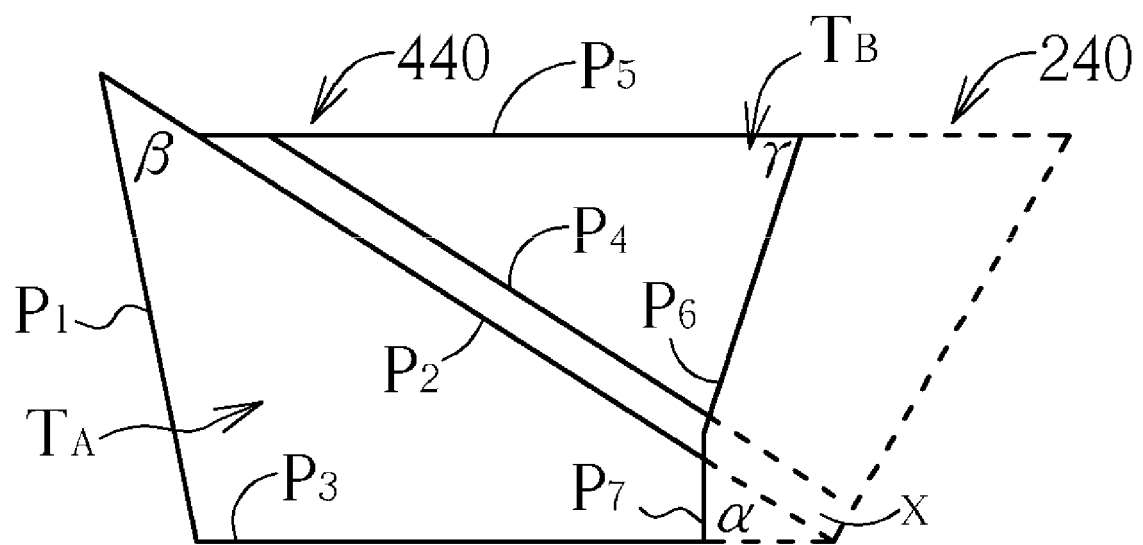
FIG. 10 is the schematic view illustrating size comparison between the prism assembly of the second embodiment in the present invention and the prism assembly of the prior art projector with higher contrast.

Please refer to FIG. 10. FIG. 10 is the schematic view illustrating size comparison between the prism assembly 440 of the second embodiment of the present invention and the prism assembly 240 of prior art. As shown in FIG. 10, the prism assembly 440 of the second embodiment in the present invention has smaller size compare to the prism assembly 240 of prior art, and it is still able to enhance the contrast of projector.

Additionally, what is worth attention is, in the first and the second embodiments of the present invention, the incident angle $\theta_{AOI}$ is approximately greater than the rotatable angle $2\theta_S$ of micro mirrors M for enhancing the penetration rate of the lights reflected by DMD 130 at prism $T_A$ and $T_B$. In contrast to this invention, when the rotatable angle $2\theta_S$ of micro mirrors M is 24°, the incident angle $\theta_{AOI}$ is also configured as 24° in prior art so that in the ON state, the lights from the light system can be emitted out and paralleled to the optical axis $A_2$ of lens assembly 120. Such method, however, when the lights are entering from prisms $T_A$ to $T_B$, the incident angle is larger so that the penetration rate of lights is lower. In the present invention, when the rotatable angle $2\theta_S$ of DMD 130 is 24°, the incident angle $\theta_{AOI}$ can be designed to 25°. Such that in the ON state, when the lights from the light system enter into prism $T_B$, the incident angle is smaller so that the penetration rate of lights is higher, and can be emitted out in the direction approximately away from the optical axis $A_2$ of lens assembly 120 after being refracted and reflected. The way the incident angle $\theta_{AOI}$ is adjusted in the present invention may be done by rotating the angle of the light system 110, which is adjusting the angle of the optical axis $A_1$, so that the optical axis $A_1$ may still be about perpendicular to plane $P_1$ but the incident angle $\theta_{AOI}$ may thus increase to 25°.

Moreover, the present invention further defines the included angles α, β, and γ so as to enhance the contrast of projector. These angles are defined as follow:

$$\alpha = (\alpha_{IN} + \alpha_{OUT})/2 \quad (1)$$

$$\beta = \alpha + \sin^{-1}[\sin(\theta_{AOI})/N_1] \quad (2)$$

$$\gamma = (180 - \theta_{CRI} - \alpha) \quad (3)$$

wherein:

$$\alpha_{IN} = \theta_{CRI} - \sin^{-1}[\sin(2\theta_S - \theta_{CONE})/N_1]$$

$$\alpha_{OUT} = \theta_{CRI} - \sin^{-1}[\sin(\theta_{CONE} + \theta_{AOI} - 2\theta_S)/N_1]$$

$$\theta_{CRI} = \sin^{-1}(1/N_1)$$

$$\theta_{CONE} = \sin^{-1}(NA)$$

$$NA = 1/(2F)$$

wherein NA is the numerical aperture (NA) of light system 110; $\theta_{CRI}$ is the total reflection threshold angle with which the lights enter into the prism assembly of the present invention through the air; $\theta_{CONE}$ is the included angle between the emitting light beam and the optical axis $A_1$ of the light system 110. Since the energy of the light source is in Gaussian distribution, as the angle α equals to $\alpha_{IN}$ or $\alpha_{OUT}$, the light energy projected by the projector in the ON state is the lowest. Thus the present invention defines angle α as the average of $\alpha_{IN}$ and $\alpha_{OUT}$, so that the light energy projected by the projector in the ON state is the highest.

Please refer to FIG. 11. FIG. 11 is the schematic view of the actual value of the included angles α and β defined above in the present invention. As shown in FIG. 11, in type 1 the focal length F is 2.4; the incident angle $\theta_{AOI}$ is 24 degrees; α and β are 33.37 degrees and 48.92 degrees, respectively. In type 3, the focal length F is 2.4; the incident angle $\theta_{AOI}$ is 26 degrees; α and β are 32.07 degrees and 48.87 degrees, respectively. In type 2, the focal length F is 2.4; the incident angle $\theta_{AOI}$ is 25 degrees; α and β are 32.72 and 48.89, respectively, wherein Type 2 is the design with the highest performance of the projector in the present invention.

To conclude, the present invention provides an improved prism assembly that when the projector is in the OFF state, the light can be emitted out after two-time total reflection in the prism assembly, so that the projector contrast may be enhanced and the light leakage in the OFF state can be further reduced; at the same time the size of the prism assembly also may be decreased and this makes it more convenient for the users. In contrast to the first conventional prism assembly, the prism assembly of a first embodiment provided according to the spirit of the present invention has a smaller size, therefore the projector that uses the prism assembly of the present invention has a reduced size and higher contrast. In contrast to the second conventional one, the prism assembly of a second embodiment provided according to the spirit of the present invention also has a smaller size, and since one of the prisms in the prism assembly has an obtuse angle, it may also enhance the contrast and decrease light leakage so that the projector that uses the prism assembly of the present invention has a smaller size and higher contrast. Thus, users may use the prism assembly and the projector provided in the present invention to reduce the space taken by a projector and to enhance the projector contrast in order to obtain a greater convenience.

The descriptions above are merely the preferred embodiments of the present invention. Those skilled in the art will readily observe that numerous modifications and alterations of the device and method may be made while retaining the teachings of the invention.

What is claimed is:

1. A projector with reduced size and higher contrast, comprising:
   a light system with a first optical axis for emitting a first light;
   a digital micro-mirror device (DMD) comprising a plurality of micro mirrors rotatable to a first angle or a second angle;
   a prism assembly comprising:
      a medium layer having a reference refractive index;
      a first prism locating at a first side of the medium layer and having a prism refractive index, the prism refractive index being larger than the reference refractive index, the first light entering the first prism and being totally reflected internally as a second light to the DMD; and
      a second prism locating at a second side of the medium layer and having the prism refractive index; and
   a lens assembly with a second optical axis, as the micro mirrors of the DMD rotating to the first angle, the micro mirrors of the DMD reflecting the second light into the lens assembly through the first prism, the medium layer, and the second prism in sequence;
   wherein as the micro mirrors of the DMD rotate to the second angle, the second light is reflected from the micro mirrors of the DMD to the prism assembly and emits out of the prism assembly in a direction away from the second optical axis after two-time internally total reflection in the prism assembly.

2. The projector of claim 1, wherein the first prism comprises:
   a first plane passed through by the first light;
   a second plane coupled to the first plane and locating at the first side of the medium layer for reflecting the first light to form the second light; and
   a third plane coupled to the first plane and the second plane, and being paralleled with the DMD.

3. The projector of claim 2, wherein the second prism comprises:
   a fourth plane locating at the second side of the medium layer;
   a fifth plane coupled to the fourth plane and being perpendicular to the second optical axis of the lens assembly; and
   a sixth plane coupled to the fourth plane and the fifth plane, as the micro mirrors of the DMD rotating to the second angle, the second light being reflected from the micro mirrors of the DMD to the sixth plane of the second prism, being totally reflected for the first time from the sixth plane to the fifth plane of the second prism whereon the second light is totally reflected for the second time, and emitting out of the prism assembly in the direction away from the second optical axis.

4. The projector of claim 3, wherein as the micro mirrors of the DMD rotate to the first angle, the micro mirrors of the DMD reflect the second light into the lens assembly through the third plane of the first prism, the second plane of the first prism, the medium layer, the fourth plane of the second prism, and the fifth plane of the second prism.

5. The projector of claim 3, wherein a first included angle between the second plane of the first prism and the third plane of the first prism is defined by following equations:

$$\alpha = (\alpha_{IN} + \alpha_{OUT})/2;$$

$$\alpha_{IN} = \theta_{CRI} - \sin^{-1}[\sin(2\theta_S - \theta_{CONE})/N_1];$$

$$\alpha_{OUT} = \theta_{CRI} - \sin^{-1}[\sin(\alpha_{CONE} + \theta_{AOI} - 2\theta_S)/N_1];$$

$$\theta_{CRI} = \sin^{-1}(1/N_1); \text{ and}$$

$$\theta_{CONE} = \sin^{-1}(NA);$$

wherein $\alpha$ represents the first included angle between the second plane of the first prism and the third plane of the first prism, $N_1$ is the prism refractive index, $\theta_{AOI}$ is an incident angle with which the second light emits into the DMD through the prism assembly, $2\theta_S$ is difference between the first angle and the second angle, $\theta_{CRI}$ is a total reflection threshold angle with which a light enters into the prism assembly, NA is numerical aperture of the light system, $\theta_{CONE}$ is an included angle between the first light and the first optical axis of the light system.

6. The projector of claim 5, wherein the $\theta_{AOI}$ is approximately greater than the $2\theta_S$.

7. The projector of claim 5, wherein a second included angle between the first plane of the first prism and the second plane of the first prism is defined by a following equation:

$$\beta = \alpha + \sin^{-1}[\sin(\theta_{AOI})/N_1];$$

wherein $\beta$ is the second included angle between the first plane of the first prism and the second plane of the first prism.

8. The projector of claim 7, wherein a third included angle between the fifth plane of the second prism and the sixth plane of the second prism is defined by a following equation:

$$\gamma = (180 - \theta_{CRI} - \alpha);$$

wherein $\gamma$ is the third included angle between the fifth plane of the second prism and the sixth plane of the second prism.

9. The projector of claim 3, wherein the second light emits out from the first plane of the first prism.

10. The projector of claim 3, wherein there is an obtuse angle between the fifth plane of the second prism and the sixth plane of the second prism.

11. The projector of claim 2, wherein the first prism further comprises a cross section locating between the second plane of the first prism and the third plane of the first prism.

12. The projector of claim 11, wherein as the micro mirrors of the DMD rotate to the second angle, the micro mirrors of the DMD reflect the second light to the cross section of the first prism, the second light is totally reflected for the first time from the cross section of the first prism to the second plane of the first prism, and after being totally reflected for the second time from the second plane of the first prism, the second light emits out of the first prism in the direction away from the second optical axis.

13. The projector of claim 12, wherein as the micro mirrors of the DMD rotate to the first angle, the micro mirrors of the DMD reflect the second light into the lens assembly through the third plane of the first prism, the second plane of the first prism, the medium layer, the forth plane of the second prism, and the fifth plane of the second prism.

14. A projector with reduced size and higher contrast, comprising:
   a light system with a first optical axis for emitting a first light;

a DMD comprising a plurality of micro mirrors rotatable to a first angle or a second angle;
a prism assembly comprising:
  a medium layer having a reference refractive index;
  a first prism locating at a first side of the medium layer and having a prism refractive index, the prism refractive index being greater than the reference refractive index, the first prism comprising:
    a first plane passed through by the first light;
    a second plane coupled to the first plane of the first prism and locating at the first side of the medium layer for totally reflecting the first light to form a second light; and
    a third plane coupled to the first plane of the first prism and the second plane of the first prism, and being paralleled with the DMD; and
  a second prism locating at a second side of the medium layer and having the prism refractive index, the second prism comprising:
    a fourth plane locating at the second side of the medium layer;
    a fifth plane coupled to the fourth plane of the second prism; and
    a sixth plane coupled to the fourth plane of the second prism and the fifth plane of the second prism, and an obtuse angle being included between the fifth plane of the second prism and the sixth plane of the second prism; and
a lens assembly being opposite to the fifth plane of the second prism and with a second optical axis, as the micro mirrors of the DMD rotating to the first angle, the micro mirrors of the DMD reflect the second light into the lens assembly through the first prism, the medium layer, and the second prism;
wherein as the micro mirrors of the DMD rotate to the second angle, the micro mirrors reflect the second light to the sixth plane of the second prism, and the second light is totally reflected for the first time from the sixth plane of the second prism to the fifth plane of the second prism, and after being totally reflected for the second time from the fifth plane of the second prism, the second light emits out of the prism assembly in a direction away from the second optical axis.

15. The projector of claim 14, wherein a first included angle between the second plane of the first prism and the third plane of the first prism is defined by following equations:

$$\alpha = (\alpha_{IN} + \alpha_{OUT})/2;$$

$$\alpha_{IN} = \theta_{CRI} - \sin^{-1}[\sin(2\theta_S - \theta_{CONE})/N_1];$$

$$\alpha_{OUT} = \theta_{CRI} - \sin^{-1}[\sin(\theta_{CONE} + \theta_{AOI} - 2\theta_S)/N_1];$$

$$\theta_{CRI} = \sin^{-1}(1/N_1); \text{ and}$$

$$\theta_{CONE} = \sin^{-1}(NA);$$

wherein $\alpha$ represents the first included angle between the second plane of the first prism and the third plane of the first prism, $N_1$ is the prism refractive index, $\theta_{AOI}$ is an incident angle with which the second light emits into the DMD through the prism assembly, $2\theta_S$ is difference between the first angle and the second angle, $\theta_{CRI}$ is a total reflection threshold angle with which a light enters into the prism assembly, NA is the numerical aperture of the light system, $\theta_{CONE}$ is an included angle between the first light and the first optical axis of the light system.

16. The projector of claim 15, wherein the $\theta_{AOI}$ is approximately greater than the $2\theta_S$.

17. The projector of claim 15, wherein a second included angle between the first plane of the first prism and the second plane of the first prism, and a third included angle between the fifth plane of the second prism and the sixth plane of the second prism are defined by following equations:

$$\beta = \alpha + \sin^{-1}[\sin(\theta_{AOI})/N_1];$$

$$\gamma = (180 - \theta_{CRI} - \alpha);$$

wherein $\beta$ is the second included angle between the first plane of the first prism and the second plane of the first prism, $\gamma$ is the third included angle between the fifth plane of the second prism and the sixth plane of the second prism.

18. A projector with reduced size and higher contrast, comprising:
a light system with a first optical axis for emitting a first light;
a DMD comprising a plurality of micro mirrors rotatable to a first angle or a second angle;
a prism assembly comprising:
  a medium layer having a reference refractive index;
  a first prism locating at a first side of the medium layer and having a prism refractive index, the prism refractive index being greater than the reference refractive index, the first prism comprising:
    a first plane passed through by the first light;
    a second plane coupled to the first plane of the first prism and locating at the first side of the medium layer for reflecting the first light to form a second light;
    a third plane coupled to the first plane of the first prism and being paralleled with the DMD; and
    a cross section coupled to the second plane of the first prism and the third plane of the first prism;
  a second prism locating at a second side of the medium layer and having the prism refractive index, comprising:
    a fourth plane locating at the second side of the medium layer;
    a fifth plane coupled to the fourth plane of the second prism; and
    a sixth plane coupled to the fourth plane of the second prism and the fifth plane of the second prism; and
a lens assembly being opposite to the fifth plane of the second prism and with a second optical axis, as micro mirrors of the DMD rotating to the first angle, the micro mirrors of the DMD reflecting the second light into the lens assembly through the first prism, the medium layer, and the second prism;
wherein as the micro mirrors of the DMD rotate to the second angle, the second light is reflected from the micro mirrors of the DMD to the cross section of the first prism, is totally reflected for the first time from the cross section to the second plane of the first prism whereon the second light is totally reflected for the second time, and emits out of the prism assembly in a direction away from the second optical axis.

19. The projector as in claim 18, wherein a first included angle between the second plane of the first prism and the third plane of the first prism is defined by following equations:

$$\alpha = (\alpha_{IN} + \alpha_{OUT})/2;$$

$$\alpha_{IN} = \theta_{CRI} - \sin^{-1}[\sin(2\theta_S - \theta_{CONE})/N_1];$$

$$\alpha_{OUT} = \theta_{CRI} - \sin^{-1}[\sin(\theta_{CONE} + \theta_{AOI} - 2\theta_S)/N_1];$$

$\theta_{CRI}=\sin^{-1}(1/N_1)$; and $\theta_{CONE}=\sin^{-1}(NA)$;

wherein $\alpha$ is the first included angle between the second plane of the first prism and the third plane of the first prism, $N_1$ is the prism refractive index, $\theta_{AOI}$ is an incident angle with which the second light emits into the DMD through the prism assembly, $2\theta_S$ is difference between the first angle and the second angle, $\theta_{CRI}$ is a total reflection threshold angle with which a light enters to the prism assembly, NA is numerical aperture of the light system, $\theta_{CONE}$ is an included angle between the first light and the first optical axis angle of the light system.

20. The projector as in claim 19, wherein a second included angle between the first plane of the first prism and the second plane of the first prism, and a third included angle between the fifth plane of the second prism and the sixth plane of the second prism are defined by following equations:

$\beta=\alpha+\sin^{-1}[\sin(\theta_{AOI})/N_1]$;

$\gamma=(180-\theta_{CRI}-\alpha)$;

wherein $\beta$ is the second included angle between the first plane of the first prism and the second plane of the first prism, $\gamma$ is the third included angle between the fifth plane of the second prism and the sixth plane of the second prism.

* * * * *